No. 715,198. Patented Dec. 2, 1902.
J. M. DALY.
GRAPHIC CHART.
(Application filed Sept. 30, 1901.)
(No Model.)
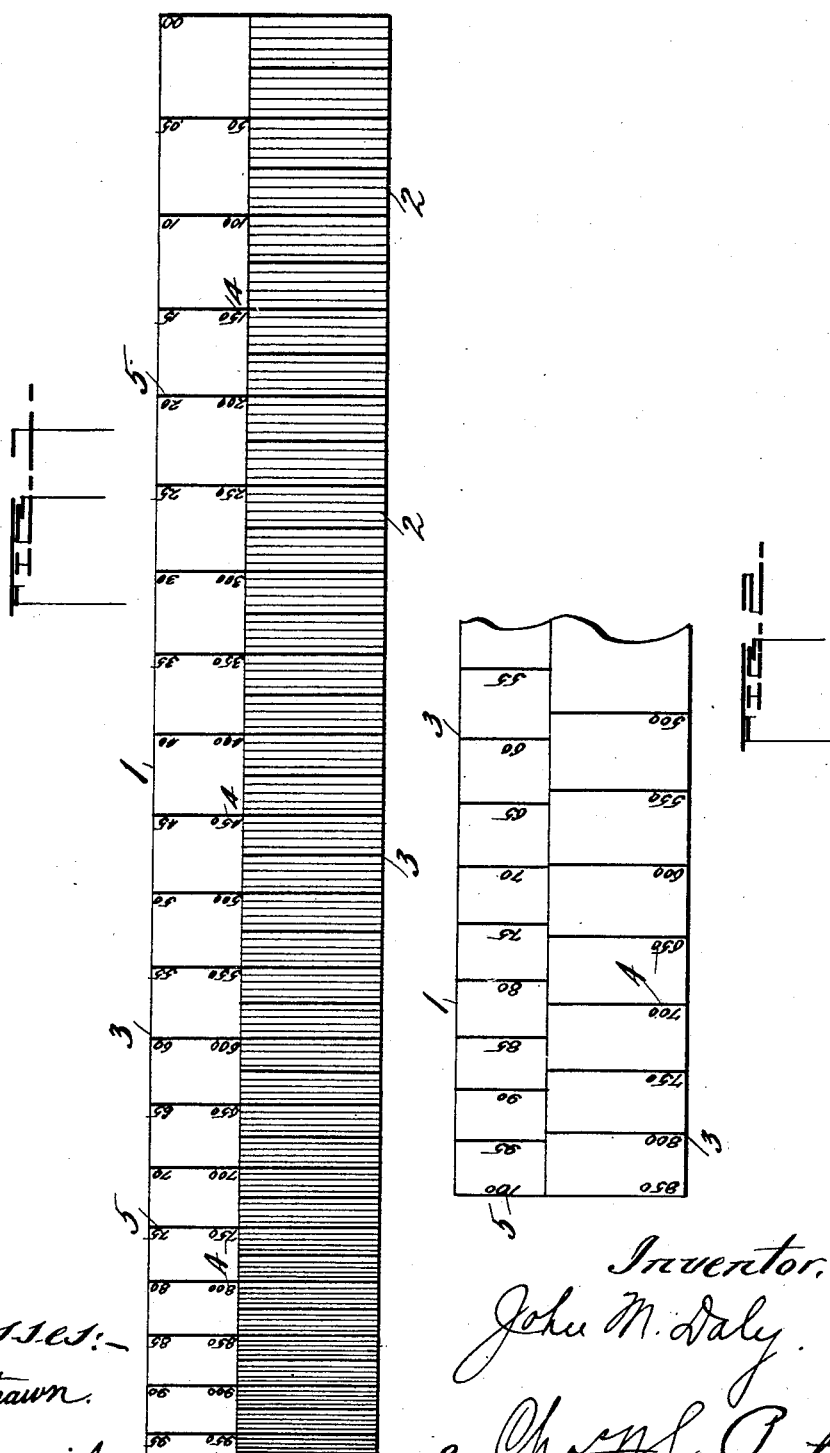
Witnesses:
J. E. Strawn.
Robert N. McCormick
Inventor,
John M. Daly.
By Chas H La Poote
Atty

UNITED STATES PATENT OFFICE.

JOHN M. DALY, OF PEORIA, ILLINOIS.

GRAPHIC CHART.

SPECIFICATION forming part of Letters Patent No. 715,198, dated December 2, 1902.

Application filed September 30, 1901. Serial No. 76,997. (No model.)

*To all whom it may concern:*

Be it known that I, JOHN M. DALY, a citizen of the United States, residing at Peoria, in the county of Peoria and State of Illinois, have invented certain new and useful Improvements in Graphic Charts; and I do hereby declare that the following is a full, clear, and exact description of the invention, which will enable others skilled in the art to which it appertains to make and use the same.

This invention relates to a scale-chart designed to be used by railroads for graphically computing the tonnage resistance of trains.

The invention has for its object the provision of a scale-chart arranged with a series of devices or signs to designate the tonnage, the said devices or signs being reduced as the tonnage increases on said chart in order to provide for length of train and curve or flange resistance.

The invention has for its further object the provision of a coacting chart or scale used in conjunction with the tonnage-chart which indicates the per cent. of tonnage hauled.

That the invention may be more fully understood and readily carried into effect, reference is had to the accompanying drawings, forming a part of this specification, in which—

Figure 1 illustrates my scale-chart, and Fig. 2 is a similar view.

The aim of the present invention is to provide a scale-chart by which yard-masters and conductors can accurately compute and measure the tonnage resistance in freight-trains and, in fact, passenger or combination trains, the chart being arranged with suitable signs indicating the number of tons which an engine is capable of hauling, it being understood that charts will vary in their make-up for use on engines of varying tonnage—that is to say, an engine of one thousand tons hauling capacity will use a scale-chart similar to that shown in Fig. 1, and an engine of eight hundred and fifty tons capacity will use a chart similar to that shown in Fig. 2, and so on with engines of varying tonnage. The per cent. of tonnage hauled when making up the trains will be indicated in the per cent. column, forming a part of the tonnage-chart, and by the use of certain devices representing tons in cars.

The application of the chart in connection with devices referred to and the key to the use of the scale-chart for computing and weighing the tons in trains of various length, of empty as well as loaded cars, is more specifically described and illustrated in an application filed of even date herewith, and this detail description will not be entered into in this application, as this application relates to the scale-chart itself, having suitable signs and numerals for indicating the tonnage capacity of engines and the per cent. of tons hauled.

The chart may be made substantially as shown in the figures, comprising a strip of material of any length, width, and thickness, as may be necessary in the practical application of the same, or may be made in various other forms than that shown and of any known material.

The chart proper is indicated as a whole as 1, having the transverse lines or equivalent signs 2 and the lines 3. In the arrangement of these lines in succession it is designed to reduce the spacing between the lines as they increase across the chart. Each line represents five tons of hauling capacity of an engine. Therefore the plurality of lines on this chart—that is, in Fig. 1—would indicate one thousand tons. The lines referred to as 3 in this instance are shown heavier than the intermediate lines, indicating twenty-five, fifty, one hundred, &c., and every other line 3 is extended across the chart and at the opposite side is used to indicate per cent. of tons hauled.

The chart may be arranged with numerals in consecutive order, as shown, from "50" up to "1,000" to indicate the tonnage, as shown at 4, and also numbered in consecutive order on every other line 3, as at 5, to indicate per cent. of tonnage hauled.

More elaborate details of numbering may be made and used and the ruling may be other than that shown so long as the principle of invention is adhered to in the use of signs similar to that shown indicating tonnage and per cent. hauled.

These charts of course will vary as above indicated—that is, the tonnage-hauling capacity of an engine will vary from five hundred tons, more or less, while the per-cent. chart will range from zero to one hundred per cent.

The devices used in connection with this chart may be of uniform or varying length and are marked to indicate the arbitrary weight of cars for measuring and weighing the resistance of same and are placed alongside of the chart in a suitable case to represent the resistance or tons in the train. The object of a reducing-scale such as shown is to provide for length of train and curve and flange resistance, which increases with the number of cars added in the make-up of the train, which has been more or less set out in the application above referred to.

Having thus fully described my invention, what I claim, and desire to secure by Letters Patent of the United States, is—

1. A scale-chart for graphically computing the tonnage resistance of trains of cars, comprising a chart arranged with devices or signs to designate tonnage, the interval corresponding to given number of tons being reduced as the number of tons is increased, and a per-cent. scale in conjunction with the tonnage-chart to indicate the per cent. of tonnage hauled, substantially for the purposes described.

2. A scale-chart for graphically computing the tonnage resistance of trains of cars, comprising a chart arranged with a plurality of lines in succession decreasing in distance across the chart and indicating tonnage, characters or numerals placed at a given point or opposite certain lines for indicating increased tonnage, a per-cent. scale opposite the tonnage-chart and characters or numerals for indicating per cent. of tonnage hauled, as and for the purposes described.

3. The means for graphically computing the tonnage resistance in railway-trains, comprising a chart or scale of a plurality of signs to designate tonnage, the interval corresponding to a given number of tons being reduced as the number of tons is increased, and the said signs grouped in divisions, and characters placed opposite the signs which distinguish the division of groups for indicating increased tonnage, substantially as described.

4. The means for graphically computing the tonnage resistance in railway-trains, comprising a chart or scale of a plurality of lines or other graphic signs, characters or numerals for indicating increased tonnage arranged in succession and placed at predetermined points throughout the length of said chart, combined with additional characters or numerals coöperating with the tonnage-chart for indicating per cent. of tonnage hauled, substantially as and for the purpose described.

5. The herein-described chart for graphically computing the tonnage resistance in railway-trains, comprising the strip 1 having transverse lines 2 and 3, shrinking the distance between the lines throughout the length of the chart and each line representing a given amount of tons hauling capacity of an engine, combined with a per-cent. chart provided by extending the lines 3 across the width of the chart, and of characters or numerals, arranged substantially as herein described.

In testimony whereof I affix my signature in presence of two witnesses.

JOHN M. DALY.

Witnesses:
AMIÉ A. BOURGEOIS,
CHARLES H. THOMAS.